United States Patent
Regep

(10) Patent No.: US 10,650,250 B2
(45) Date of Patent: May 12, 2020

(54) DETERMINATION OF LOW IMAGE QUALITY OF A VEHICLE CAMERA CAUSED BY HEAVY RAIN

(71) Applicant: Continental Automotive GmbH, Hannover (DE)

(72) Inventor: Cezar Regep, Dumbravita (RO)

(73) Assignee: Continental Automotive GmbH, Hannover (DE)

( * ) Notice: Subject to any disclaimer, the term of this patent is extended or adjusted under 35 U.S.C. 154(b) by 238 days.

(21) Appl. No.: 15/834,500

(22) Filed: Dec. 7, 2017

(65) Prior Publication Data

US 2018/0165523 A1  Jun. 14, 2018

(30) Foreign Application Priority Data

Dec. 13, 2016 (EP) .................................... 16465560

(51) Int. Cl.
| | | |
|---|---|---|
| *G06K 9/00* | (2006.01) | |
| *G06T 7/42* | (2017.01) | |
| *G06T 7/00* | (2017.01) | |
| *G06K 9/46* | (2006.01) | |

(52) U.S. Cl.
CPC ....... *G06K 9/00791* (2013.01); *G06K 9/4604* (2013.01); *G06T 7/42* (2017.01); *G06T 7/97* (2017.01); *G06T 2207/10016* (2013.01); *G06T 2207/30252* (2013.01)

(58) Field of Classification Search
CPC .... G06K 9/00791; G06K 9/4604; G06T 7/97; G06T 7/42; G06T 2207/30252; G06T 2207/10016
See application file for complete search history.

(56) References Cited

U.S. PATENT DOCUMENTS

| | | | | |
|---|---|---|---|---|
| 7,860,275 B2* | 12/2010 | Leleve | ................. | B60S 1/0822 |
| | | | | 356/239.8 |
| 2014/0015984 A1* | 1/2014 | Seow | ................. | H04N 17/002 |
| | | | | 348/187 |
| 2015/0310304 A1 | 10/2015 | Robert et al. | | |
| 2016/0339959 A1* | 11/2016 | Lee | ................. | G06K 9/00805 |
| 2016/0366367 A1* | 12/2016 | Chen | ...................... | G06T 5/003 |

OTHER PUBLICATIONS

Nashashibi, Fawzi et al, "Detection of Unfocused Raindrops on a Windscreen using Low Level Image Processing", 2010 11th International Conference on Control Automation Robotics & Vision, Singapore, 2010, pp. 1410-1415.
Cord, Aurelien et al, Detecting Unfocused Raindrops In-Vehcile Multipurpose Cameras, IEEE Robotics & Automations Magazine, Mar. 2014, pp. 49-56.
European Search Report and Written Opinion dated Dec. 13, 2016 from corresponding International Patent Application No. 16465560. 7.

* cited by examiner

*Primary Examiner* — Bobbak Safaipour

(57) ABSTRACT

A method for detecting heavy rain in images includes providing a series of images as input information, the images relating to a scene external to a vehicle viewed through a pane of the vehicle. A measure of blur is evaluated in an area of interest in the images. The method also includes analyzing the course of the measured blur values over time in order to detect transitions between images with low blur values and images with high blur values or vice versa. Heavy rain may then be detected from the detected transitions and information output in response to the heavy rain being detected.

6 Claims, 5 Drawing Sheets a. Dirac-Structure b. Roof-Structure c. Astep-Structure d. Gstep-Structure

DETERMINATION OF LOW IMAGE QUALITY OF A VEHICLE CAMERA CAUSED BY HEAVY RAIN

CROSS REFERENCE TO RELATED APPLICATION

This application claims the benefit of European application No. 16465560.7, filed Dec. 13, 2016, which is hereby incorporated by reference.

TECHNICAL FIELD

The technical field relates generally to a method and a device for the determination of the quality of an image acquired by a camera, and more specifically to the determination of a low image quality caused by heavy rain. In particular the method and device can be used in a vehicle.

BACKGROUND

Rain detection by means of image processing of images taken by a camera which is focused on a windshield is known. Such rain detection can be realized by looking for droplets on the windshield. A disadvantage of such rain detection is that the camera needs to be focused on the windshield, whereas cameras used as sensor for advanced driver assistance systems in vehicles are used to monitor the surroundings of the vehicle and are therefore focused to infinity or almost to infinity.

PCT publication No. WO 2006/024247 A1 discloses a method for detecting precipitation, especially rain and fog, on a windscreen, which is not based on an active illumination of the windscreen or a measurement of the reflectivity, but on a camera using a plurality of adjacent pixels for detecting an image of a target area. Said target area is located in the surroundings of the vehicle, and the windscreen is thus represented in a blurred manner. In the event of a blurred representation, raindrops or fog on the windscreen produce a soft-focus effect in the image. The sharpness of the image and/or the difference in contrast of adjacent pixels is evaluated and the presence of precipitation is detected therefrom, the image is then preferably subjected to a two-dimensional Fourier transformation and the spatial frequencies are evaluated. A first image is recorded especially for a low contrast target area, a windscreen wiper passing over the windscreen in the visual region of the camera or a heating process is activated, and a second image is then recorded, and both images are evaluated according to changes.

U.S. Pat. No. 7,860,275 B2 discloses a method for detecting raindrops on a windscreen, which uses a camera, which is fitted inside the vehicle opposite the windscreen and which is focused at infinite. The method comprises steps of acquiring images by a camera through the windscreen, camera preferably focused at infinite, retrieving the contours of the spots present on the acquired images, and realizing the histogram of the widths of contours of the spots. It has been proven that a spot corresponding to a droplet of water on the windscreen could be distinguished from other spots (corresponding for example to an object of the landscape outside the vehicle) due to its width of contour, which may be quantified by a certain number of pixels. The droplets of water on a windscreen indeed present a contour, which is relatively wider than other spots. Establishing a histogram of these widths of contour makes it possible to select the contour points corresponding to the droplets, then eventually "to reconstruct" these droplets in the images by processing, in order to characterize them finally.

German patent publication No. DE 102011055343 A1 discloses a method for the detection of rain from an image of a camera that is partially focused on the windscreen of a vehicle. The method involves detecting an edge in an evaluation area of the camera image, and determining a measurement of the increase of the edge. The edge with a steep rise is classified as part of the potential raindrop on the disk imaged in the evaluation area. The span width and standard deviation of intensity values (X-1 to X-9) inside a window are evaluated with adjacent pixels for determination of the increase of edge at a pixel position (p-11 to p-45), where the pixel position lies in the center of the window.

Tong, H., Li, M., Zhang, H., & Zhang, C. (Tong et al.) propose a method for "Blur detection for digital images using wavelet transform" in their paper of the same title presented at Multimedia and Expo, 2004, ICME '04, 2004 IEEE International Conference on (Vol. 1, pp. 17-20), IEEE.

Nashashibi et al. present in their publication "Detection of Unfocused Raindrops on a Windscreen using Low Level Image Processing", *International Conference on Control, Automation, Robotics and Vision*: ICARV '2010, December 2010, Singapore, pp. 1410-1415, a method where the camera is focused at infinity and rain is detected via image processing. The detection of rain in this publication is based on local intensity of the pixels and number of edges change when there is a drop on the windshield.

Several disadvantages of this method are mentioned in the subchapter B. (Discussion) of the chapter V. (Experimental Results) of the publication.

As such, it is desirable to present a method to determine the quality of an image by detecting heavy rain on a windshield of a vehicle with a camera. In addition, other desirable features and characteristics will become apparent from the subsequent summary and detailed description, and the appended claims, taken in conjunction with the accompanying drawings and this background.

SUMMARY

A starting point of the present disclosure is the idea to detect "heavy rain" based on the effect produced on the windshield by the combination of heavy rain and wiper movements. A situation in which rain is so intense, that the windshield of a vehicle is wetted in such amounts that a camera inside the vehicle (and the driver) can hardly see any objects outside the vehicle is called heavy rain. In such a case, it is favorable that the control unit of the camera can output a blockage signal in order to inform the system and/or the driver that camera detection is actually blocked and driver assistance functions or automated vehicle functions requiring camera signals cannot be maintained.

The camera is disposed behind a pane, in particular in the interior of a vehicle e.g. behind a windscreen, and is focused onto a far range that lies in front of the pane. The camera preferably comprises an objective for focusing and an image sensor, e.g., a CCD or CMOS sensor.

The disclosure provides a reliable method to determine the quality of an image by detecting heavy rain with a vehicle camera, in particular with a driver assistance camera.

It can be observed on the image that when the wipers are not moving the image is blurred due to the water on the windshield and when the wipers move across the windshield the image is clear. We can say that for a period of time the effect is cyclic. That means the overall blur of the image will go from high to low with a period depending on the speed of the wipers. Based on this blur-deblur of the image, heavy rain is detected.

According to a first aspect, there is provided a method for detecting heavy rain in images, comprising:
a) providing a processing unit with a series of images, the images relating to a scene external to a vehicle viewed through a pane of the vehicle;
b) evaluating (with the processing unit) a measure of blur in an area of interest in the series of images;
c) analyzing the course of the measured blur values over time in order to detect transitions between images with low blur values and images with high blur values or vice versa;
d) detecting heavy rain from the detected transitions; and
e) providing an output information in case heavy rain is detected.

The camera may be placed such that its field of view through the pane is wiped over by the wipers of the vehicle.

According to a particular aspect, in step c) a threshold value is used to detect a transition between images having a local minimum blur value and subsequent images having a local maximum blur value or vice versa. A useful threshold can be determined from a set of curves of blur values recorded in different realistic scenarios (rainy conditions). The threshold is used in order to distinguish real blur transitions from measured (recorded) noise fluctuations.

According to another particular aspect, in step d) a state of heavy rain is detected, if the number of transitions detected within a determined time period is exceeding a threshold ratio. Also this threshold ratio can be determined from a set of curves of blur values recorded in different realistic scenarios (e.g. with heavy rain, with light rain, without rain, at daytime, at nighttime).

According to another particular aspect, the area of interest represents a part of a road surface in an image. The area of interest that is evaluated may be chosen (or predetermined) such that usually a part of the road surface may be the content of this area within a recorded image. For example, lane markings on the road surface or other vehicles on the road may then serve as objects providing edges in the image.

According to another particular aspect, the measure of blur is calculated from edges found in the area of interest.

German patent publication No. DE 102011055343 A1 shows that the steepness of edges can evaluated in order to detect focused objects represented by edges with a steep intensity gradient while for other objects the less focused they are the smoother the intensity gradient of their edges in the image becomes. By applying the proposed evaluation methods, a measure of blur can be defined, as blur corresponds to smoothed intensity gradients. Other methods to calculate blur can be used as well and as will be described herein in more detail.

According to another particular aspect, edges are found using HAAR transform.

According to another particular aspect, edges are classified as Dirac, Roof, Astep or Gstep types, as presented by Tong et al. The measure of blur proposed by Tong et al. takes into account the classified edges and is called "BlurExtent" or blur confident coefficient. Details of this approach will be discussed later in this description.

According to a second aspect, there is provided a device for detecting heavy rain in images, comprising:
an input unit;
a processing unit; and
an output unit.

The input unit is configured to provide the processing unit with a series of images, the images relating to a scene external to a vehicle viewed through a pane of the vehicle.

The processing unit is configured
to measure blur in an area of interest in the series of images,
to analyze the course of the measured blur values over time in order to detect transitions between images with low blur values and images with high blur values or vice versa, and
to detect heavy rain from the detected transitions.

The output unit is configured to provide an information in case heavy rain is detected.

According to a particular aspect the device is further comprising a camera configured to record the series of images and transmit the recorded images to the input unit.

According to another particular aspect, the camera is not focused on the pane (e.g., the windscreen) of the vehicle. In other words, the camera may be focused to infinity or close to infinity.

It has to be noted that embodiments of the present invention are described with reference to different subject-matters. In particular, some embodiments are described with reference to method type claims, whereas other embodiments are described with reference to the device type claims.

However, a person skilled in the art will gather from the above and the foregoing description that, unless otherwise notified, in addition to any combination of features belonging to one type of the subject-matter also any combination between features relating to different subject-matters is considered to be disclosed with this application.

However, all features can be combined providing synergetic effects that are more than the simple summation of these features.

While the method and device have been illustrated and described in detail in the drawings and foregoing description, such illustration and description are to be considered illustrative or exemplary and not restrictive; the present invention is not limited to the disclosed embodiments.

Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. A single processor or controller or other unit may fulfill the functions of several items recited in the claims.

The mere fact that certain measures are recited in mutually different dependent claims does not indicate that a combination of these measures cannot be used to advantage.

A computer program performing the method of the present invention may be stored on a computer-readable medium. A computer-readable medium may be a floppy disk, a hard disk, a CD, a DVD, an USB (Universal Serial Bus) storage device, a RAM (Random Access Memory), a ROM (Read Only Memory) or an EPROM (Erasable Programmable Read Only Memory).

A computer-readable medium may also be a data communication network, for example the Internet, which allows downloading a program code.

The methods, systems, and devices described herein may be implemented as software in a Digital Signal Processor, DSP, in a micro-controller or in any other side-processor or as a hardware circuit within an application specific integrated circuit, ASIC, complex programmable logic device, CPLD or field programmable gate arry, FPGA.

The present method described herein can be implemented in digital electronic circuitry or in computer hardware, firmware, software, or in combinations thereof, for instance in available hardware of conventional medical imaging devices or in new hardware dedicated for processing the methods described herein.

BRIEF DESCRIPTION OF THE DRAWINGS

Exemplary embodiments will be described in the following with reference to the following drawings.

DETAILED DESCRIPTION

Figure 1:
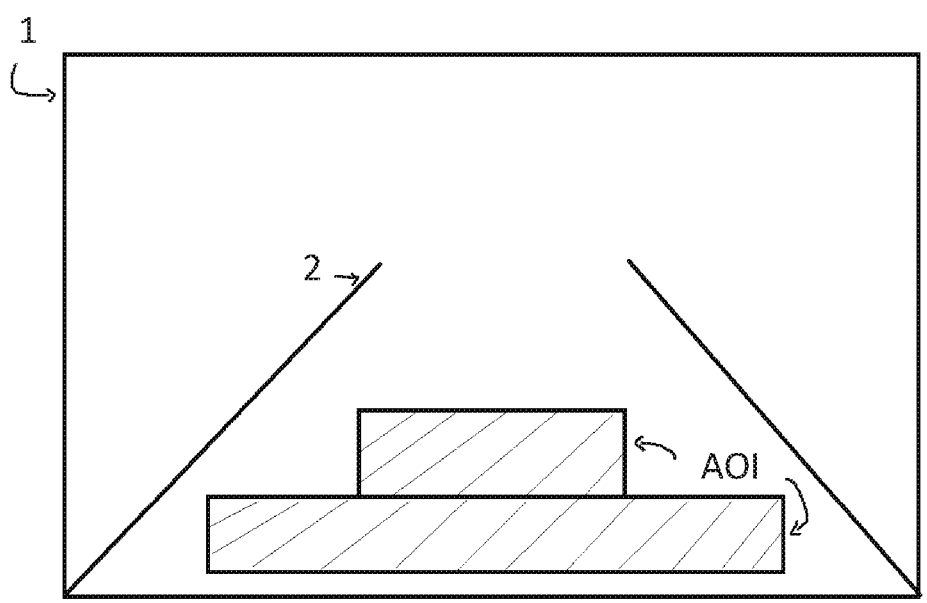
FIG. 1 shows a schematic image recorded by a camera mounted in a vehicle looking through the windscreen.

FIG. 1 shows an image 1 of a camera mounted in a vehicle looking through the windscreen. The blur is computed in an area of interest ("AOI") consisting of a part of the image. The AOI is chosen in a way that it contains a part of the surface of the road 2 in front of the vehicle. While in FIG. 1 the AOI contains two adjacent rectangles of different size, this is not necessarily the case for the purpose of the proposed method. The AOI could be a single rectangle, a single square or a different geometric area as well.

In an example, detection of blur comprises utilization of a Haar wavelet transform. In an example, the Haar wavelet transform is utilized to detect blur in an area-of-interest within an image. In an example, detection of a blurred AOI comprises a determination of a measure of local gradients and/or a measure of the sharpness of features in the AOI. In an example, detection of a blurred AOI comprises utilization of an edge detection algorithm. In an example, detection of a blurred AOI comprises utilization of a point spread function applied over different spatial areas of the image. In an example, detection of a blurred AOI comprises utilization of a Fourier transform or Fast Fourier transform applied over the AOI. In an example, detection of a blurred region comprises utilization of a Gaussian Laplace filter over the AOI. In other words, as the image has been acquired by a camera that is not focused on the windscreen but is configured to view the scene outside of the vehicle, the outside scene will be characterized by features that are in the absence of rain on the pane in focus and as such have sharp edges, strong gradients etc. However, a region of the image where there is rain on the pane will suffer to a certain extent "blur" or be out of focus as the rain (additional optical element) changes the focus of the camera. An AOI of a wetted pane will be characterized by edges that are not as sharp as the AOI of a dry pane and gradients that are not as strong as the AOI of an image recorded with a dry pane. The processing unit then uses image processing algorithms to analyze the AOI, at an appropriate spatial scale, to determine if that the AOI is blurred or not. This determination can be called 'self contained', in that the determination can be made on the basis of the analysis of the AOI.

Image Analysis

A good way to indicate the blurriness degree is represented by the edges present in the image. Indeed, cases in which no edges may occur (examples include a dark night and/or a cloudless blue summer sky) are possible, but unlikely in a series of images recorded, especially from a camera of a driving vehicle. Several types of edges are of interest in order to analyze an image's blurriness. These edges are:

a) the Dirac,
b) the Roof,
c) the Astep,
d) the Gstep

Figure 2:
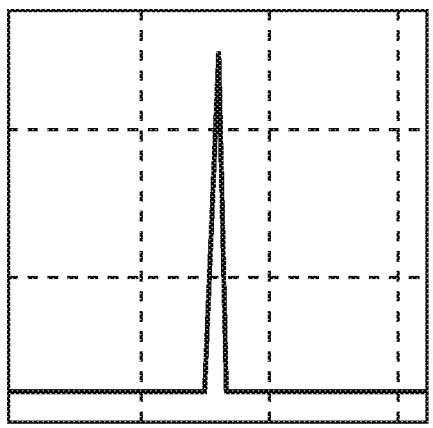
FIG. 2 shows examples of edge-types that can be used in order to determine an image's blurriness.
Figure 2:
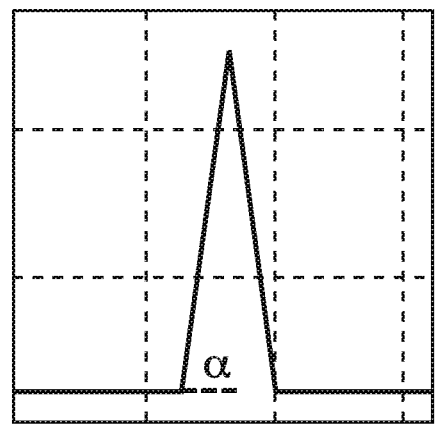
Figure 2:
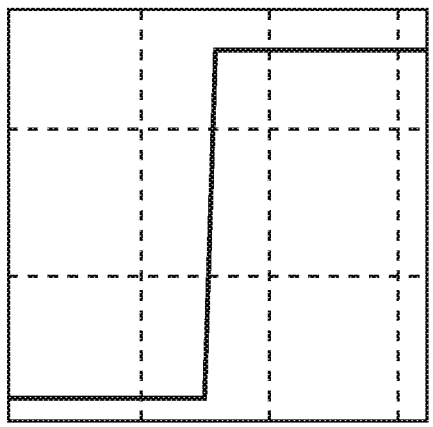
Figure 2:
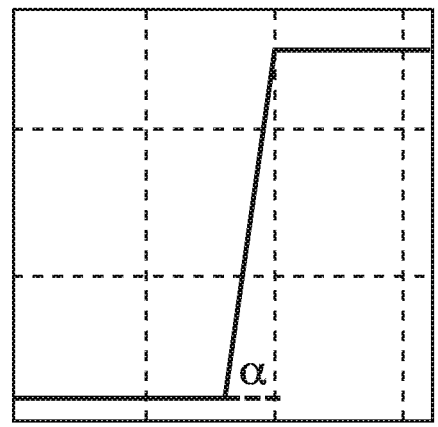

These edges can be seen in FIG. 2. The structures shown represent different types of intensity changes.

In case of an abrupt edge, high frequencies are involved. Therefore, an ideal image with a dry pane will have edges of types Dirac and Astep. In case of limited frequencies due to rain on the pane, they become of types b) and d)—blurry. As such an image edge analysis is used to reveal information regarding the blurriness in the area of interest within an image.

Specifically, a Haar algorithm is used to establish the blurriness of the image. Performing a Haar wavelet transform will result in a hierarchical pyramid like structure. The decomposition level in this case is 3. The AOI is then divided in N×N windows/tiles, each being a power of 2 (in fact this is the reason why the block's dimensions are 16×16). A block (which is often referred to as a tile) is considered if there is a change (an edge) in horizontal, vertical or diagonal directions. However, for each of them there is a threshold. For a specific block, if the change exceeds the threshold, the said block is considered to be an edge point. Changes exceeding a threshold are considered in all directions in order to compute one value for each image (the original one plus two pyramidal images). Several rules apply once these values are found. For every block labeled an edge point, if the computed value in the original image exceeds the value computed in the level 1 image and the level 1 image exceeds the level 2 image computed value, the block is a Dirac or Astep structure, otherwise it is a GStep or Roof edge. If the first level value is greater than the other two, the block is a Roof edge.

While Dirac and Astep edges are characteristic for unblurred images, Roof and Gstep edges can be considered to define a measure for blur in an image. For Roof and Gstep structures, there is a parameter α ($0<\alpha<\pi/2$) indicating the sharpness of the edge: the larger is α the sharper the edge is.

Depending on a threshold, it can be determined whether a Roof- or Gstep-structure more likely to be in a blurred image. The percentage of Roof- and Gstep-structures which are more likely to be in a blurred image can be used as a measure of blur (blur extent).

Further details on the Haar wavelet transform can be found in the following paper (see chapter 2. Blur detection scheme): Tong, H., Li, M., Zhang, H., & Zhang, C. (2004, June), "Blur detection for digital images using wavelet transform", *Multimedia and Expo,* 2004, ICME '04, 2004 IEEE International Conference on (Vol. 1, pp. 17-20), IEEE.

Figure 3:
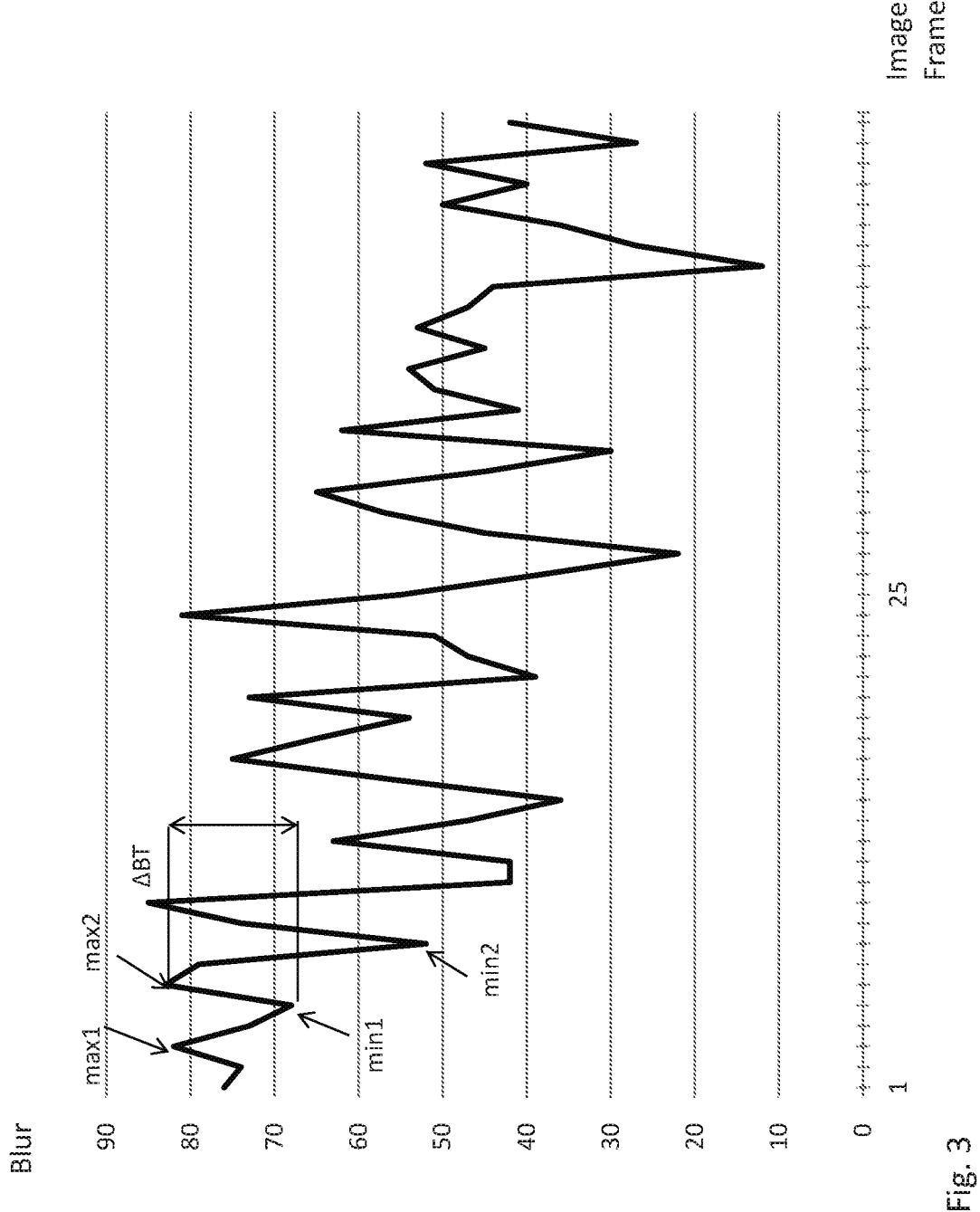
FIG. 3 shows an example of calculated blur values on 50 consecutive images.

FIG. 3 shows a measurement example of the calculated blur values on 50 consecutive images recorded with a vehicle camera. The graph contains several increase-decrease iterations. Local maxima and minima can be seen.

Water in the form of raindrops or a water film on the windshield will blur the image acquired by the camera. After a wiper of the vehicle swept over the windscreen the blur will be reduced significantly.

The blur value will increase to a local maximum and then decrease to a local minimum with a period depending on the speed of the wipers.

A certain threshold blur value can be used to discriminate a transition between a blur and a sharp state or vice versa caused by the effect of accumulation of water on the glass pane or wiping the water off the glass pane from smaller blur changes caused by noise.

In FIG. 3 one can see a first local maximum blur value max 1 at image frame number 3, followed by a local minimum blur value min 1 at image frame number 5. At image frame number 6 a second local maximum blur value max 2 exists, followed by another local minimum blur value min 2 at image frame number 8.

A suitable threshold value $\Delta BT$ is shown as well in FIG. 3.

A transition can be detected where a local maximum of the blur value exceeds a preceding local minimum of the blur value at least for the threshold value or a local minimum value goes below at least the threshold value less than the preceding local maximum value. As in this example the wiper speed was controlled by an additional rain sensor independent of the camera, the cycle time is not necessarily constant but may depend on the amount of rain sensed by the rain sensor.

In a next step of the method one can count how many transitions exceeding the defined threshold ratio exist during a given time interval (e.g., per minute).

Figure 4:
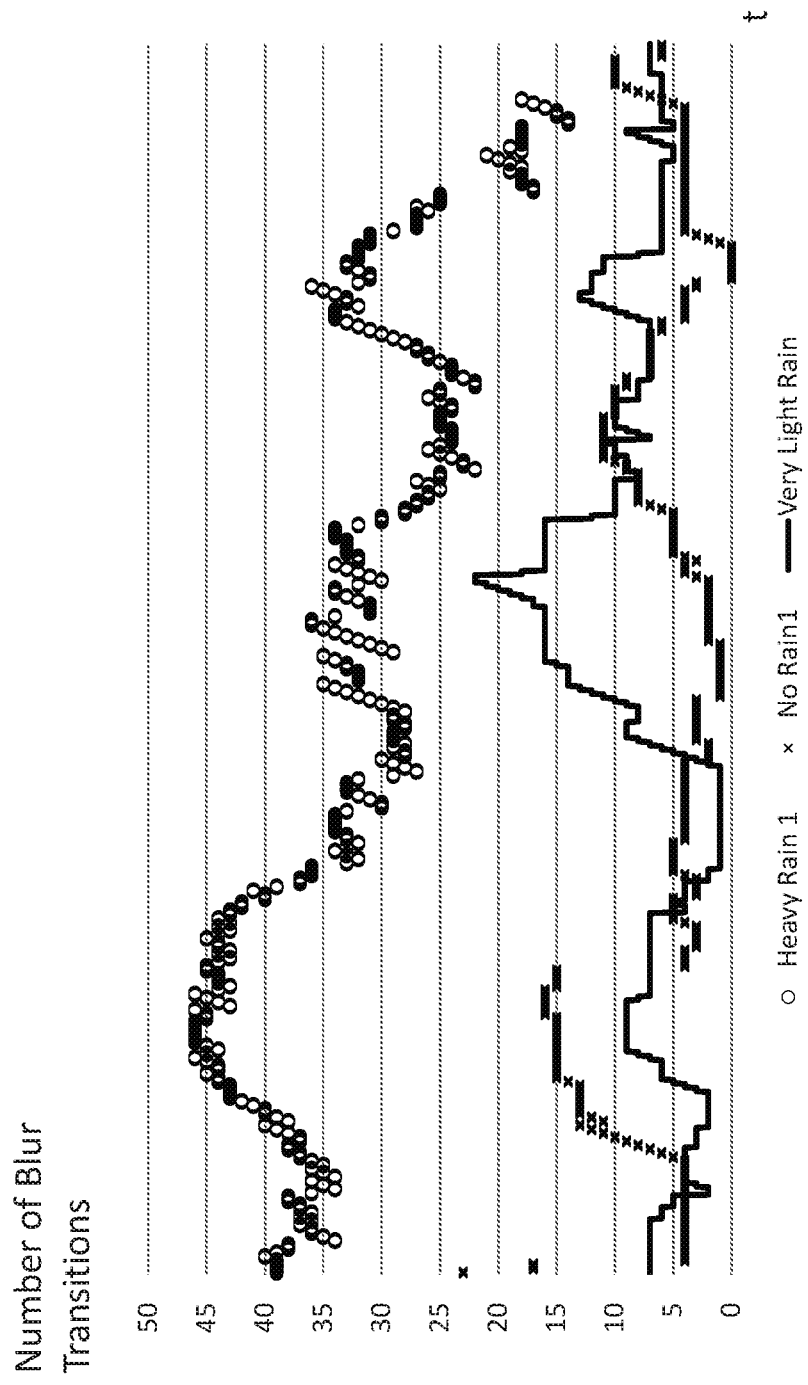
FIG. 4 shows a first example of counted transitions per time interval over time.
Figure 5:
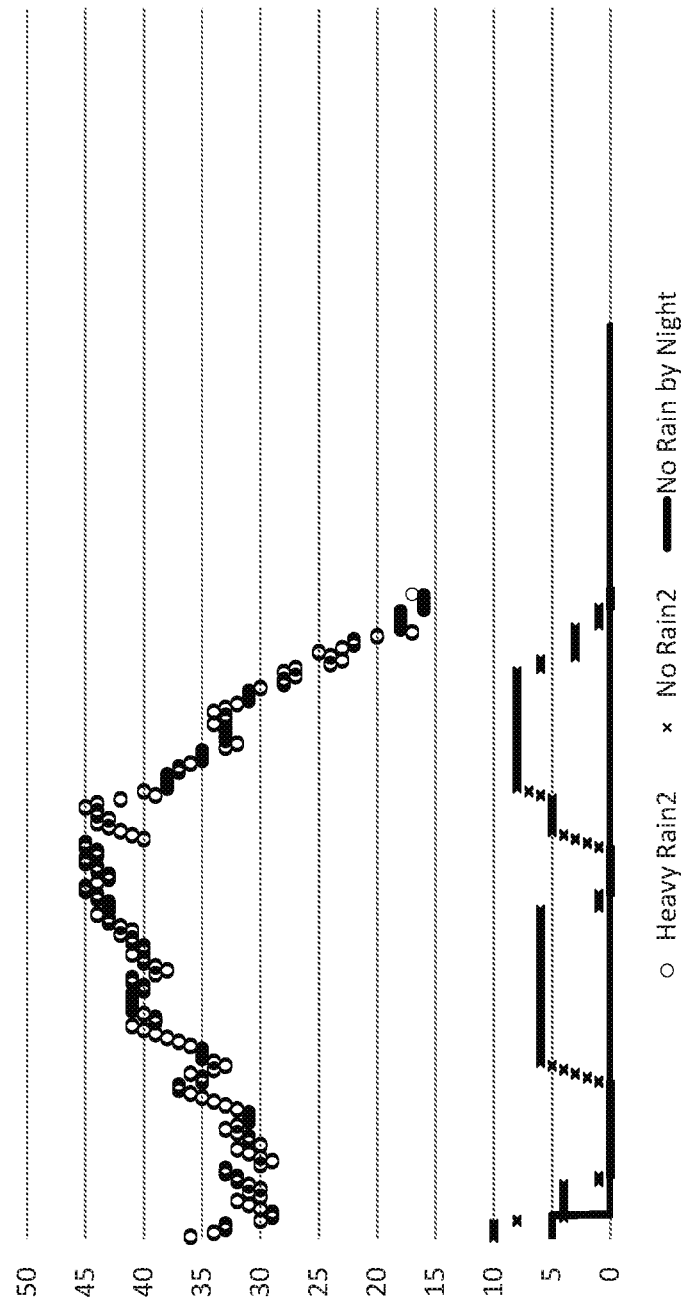
FIG. 5 shows a second example of counted transitions per time interval over time.

FIGS. 4 and 5 show measured examples of such counted transitions per time interval over time.

If the number of transitions or transition cycles per time interval is higher than a defined threshold ratio, heavy rain can be detected and a low image quality is determined in this case.

FIG. 4 shows three different curves showing the number of transitions measured during three different rain/ambient conditions:

Circles: heavy rain was present, slowly changing to medium rain in the end.
This curve shows the highest number of blur/deblur transitions per time interval. It is starting with about 40 transitions, varying between about 45 to 15 (in the end), the majority having more than 30 transitions.

Crosses: no rain (during daytime).
This curve varies between about 0 and 20 transitions per time interval, the majority having not more than 5 transitions.

Solid line: very light rain.
This curve shows permanently more than 0 transitions, between about 1 and 20 transitions per time interval, the majority having more than 5 transitions.

FIG. 5 shows another three curves showing the number of transitions measured during three different rain/ambient conditions:

Circles: initially heavy rain, changing to medium/light rain in the end.
Also this curve shows highest number of blur/deblur transitions per time interval. Starting with about 30-35 transitions, varying between about 45 to 15, majority more than 30 transitions Crosses: no rain situation
This curve shows between about 0 and 10 transitions per time interval.

Solid line: No rain situation by night, no illumination of the windscreen.
This curve is starting with about 5 transitions, rapidly decreasing to 0 transitions.

In this situation, the detection depends on the road illumination, mainly provided by the headlights of the own vehicle. Objects that still account for transitions being objects passing through the area of interest, e.g., reflective road markers, other reflecting elements or active external light sources.

By looking at the curves shown in FIGS. 4 and 5, one skilled in the art could identify that a suitable threshold ratio should be approximately between 20 and 30 transitions per time interval. While it is important to detect heavy rain in a robust way, false positive detections should be avoided, if there are only single transition rates higher than the threshold rate. Therefore, it might be helpful to use a threshold ratio of 25 or even 30 transitions per time interval. Otherwise camera based driver assistance functions could be turned off already in light or medium rain situations.

In another exemplary embodiment, a computer program or computer program element is provided that is configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

According to a further exemplary embodiment, a computer readable medium, such as a CD-ROM, is presented wherein the computer readable medium has a computer program element stored on it which computer program element is described by the preceding section.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the method and device has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A method for detecting heavy rain in images, comprising:
   providing a series of images as input information, the images relating to a scene external to a vehicle viewed through a pane of the vehicle;
   evaluating a measure of blur in an area of interest in the images, wherein the area of interest includes a part of a surface of a road in front of the vehicle and wherein the measure of blur is calculated from edges found in the area of interest utilizing a HAAR wavelet transform, wherein a percentage of Roof- and Gstep- are used as a measure of blur;
   detecting transitions between images with low blur values and images with high blur values or vice versa by analyzing the course of the measured blur values over time;
   detecting heavy rain from the detected transitions, wherein a state of heavy rain is determined if the number of transitions detected with a determined time period exceeds a threshold ratio; and
   providing an output information in the case where heavy rain is detected.

2. A method as set forth in claim 1, wherein detecting transitions between images with low blur values and images with high blur values or vice versa comprises utilizing a threshold value to detect a transition between images having a local minimum blur value and subsequent images having a local maximum blur value or vice versa.

3. A method as set forth in claim 1 wherein edges are classified as Dirac, Roof, Astep, or Gstep types and the measure of blur takes into account Roof, Astep and Gstep type edges.

4. A device for detecting heavy rain in images, comprising:
   an input unit;
   a processing unit; and
   an output unit;
   wherein, the input unit is configured to provide the processing unit with a series of images, the images relating to a scene external to a vehicle viewed through a pane of the vehicle;
   wherein, the processing unit is configured to
      evaluate a measure of blur in an area of interest in the images, wherein the area of interest includes a part of a surface of a road in front of the vehicle and wherein the measure of blur is calculated from edges found in the area of interest utilizing a HAAR wavelet transform, wherein a percentage of Roof- and Gstep- are used as a measure of blur,
      detect transitions between images with low blur values and images with high blur values or vice versa by analyzing the course of the measured blur values over time, and
      detect heavy rain from the detected transitions, wherein a state of heavy rain is determined if the number of transitions detected with a determined time period exceeds a threshold ratio; and
   wherein, the output unit is configured to provide information in response to heavy rain being detected.

5. A device as set forth in claim 4 further comprising a camera configured to record the series of images and transmit the recorded images to the input unit.

6. A device as set forth in claim 5 wherein the at least one camera is not focused on the pane of the vehicle.

* * * * *